(12) United States Patent
Kumar et al.

(10) Patent No.: US 9,099,758 B2
(45) Date of Patent: *Aug. 4, 2015

(54) LITHIUM-AIR CELL INCORPORATING LITHIUM ALUMINUM GERMANIUM PHOSPHATE CATHODE

(75) Inventors: Binod Kumar, Dayton, OH (US); Jitendra Kumar, Dayton, OH (US)

(73) Assignee: University of Dayton, Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/153,042

(22) Filed: Jun. 3, 2011

(65) Prior Publication Data

US 2011/0262836 A1    Oct. 27, 2011

Related U.S. Application Data

(63) Continuation-in-part of application No. 12/486,444, filed on Jun. 17, 2009.

(60) Provisional application No. 61/074,316, filed on Jun. 20, 2008, provisional application No. 61/351,331, filed on Jun. 4, 2010.

(51) Int. Cl.
*H01M 4/00* (2006.01)
*H01M 12/08* (2006.01)
(Continued)

(52) U.S. Cl.
CPC ............ *H01M 12/08* (2013.01); *C04B 35/447* (2013.01); *H01M 2/1686* (2013.01); *H01M 4/382* (2013.01); *H01M 4/9016* (2013.01); *H01M 4/96* (2013.01); *C04B 2235/3203* (2013.01);

(Continued)

(58) Field of Classification Search
CPC ..... H01M 4/382; H01M 4/9016; H01M 4/96; H01M 12/08; H01M 6/187; H01M 2300/0082; H01M 2300/0094; H01M 2300/0068; C05B 35/4474
USPC ................... 429/402–407, 209–246
See application file for complete search history.

(56) References Cited

U.S. PATENT DOCUMENTS 6,190,806 B1    2/2001 Kumar et al.
2002/0055046 A1*  5/2002 Ono et al. ............... 429/324
(Continued)

FOREIGN PATENT DOCUMENTS

EP    1926164 A1    5/2008
JP    2000-251938 A    9/2000
(Continued)

OTHER PUBLICATIONS

Binod Kumar et al.; Space Charge Signature and Its Effects on Ionic Transport in Heterogeneous Solids; Journal American Ceramic Society; 2007; pp. 3323-3325; vol. 90; No. 10; The American Ceramic Society.

(Continued)

*Primary Examiner* — Milton I Cano
*Assistant Examiner* — Stephen Yanchuk
(74) *Attorney, Agent, or Firm* — Dinsmore & Shohl LLP

(57) ABSTRACT

A lithium-air cell is provided which incorporates a cathode comprised of a lithium aluminum germanium phosphate (LAGP) glass-ceramic material for facilitating an oxygen reduction reaction. The lithium-air cell further includes a lithium anode and a solid electrolyte which may be in the form of a membrane comprising LAGP glass-ceramic and/or polymer ceramic materials.

15 Claims, 4 Drawing Sheets

(51) Int. Cl.
*H01M 6/18* (2006.01)
*C04B 35/447* (2006.01)
*H01M 2/16* (2006.01)
*H01M 4/38* (2006.01)
*H01M 4/90* (2006.01)
*H01M 4/96* (2006.01)

(52) U.S. Cl.
CPC . *C04B2235/3217* (2013.01); *C04B 2235/3287* (2013.01); *H01M 2300/0068* (2013.01); *H01M 2300/0082* (2013.01); *H01M 2300/0091* (2013.01); *H01M 2300/0094* (2013.01); *Y02E 60/50* (2013.01)

(56) References Cited

U.S. PATENT DOCUMENTS

| | | | |
|---|---|---|---|
| 2004/0106046 A1* | 6/2004 | Inda | 429/322 |
| 2005/0175894 A1 | 8/2005 | Visco et al. | |
| 2006/0063051 A1 | 3/2006 | Jang | |
| 2007/0072034 A1* | 3/2007 | Barker et al. | 429/31 |
| 2007/0117026 A1 | 5/2007 | Kumar et al. | |
| 2007/0141432 A1 | 6/2007 | Wang et al. | |
| 2007/0172739 A1* | 7/2007 | Visco et al. | 429/322 |
| 2007/0202400 A1* | 8/2007 | Yoshida et al. | 429/203 |
| 2009/0136830 A1* | 5/2009 | Gordon | 429/50 |
| 2009/0246617 A1 | 10/2009 | Howard et al. | |
| 2009/0311597 A1* | 12/2009 | Chiang et al. | 429/213 |
| 2010/0062341 A1* | 3/2010 | Hambitzer | 429/231.95 |

FOREIGN PATENT DOCUMENTS

| | | | |
|---|---|---|---|
| JP | 2005-166685 A | | 6/2005 |
| JP | 2006-286414 A | | 10/2006 |
| JP | 2007-294429 A | | 11/2007 |
| JP | 2008-112661 A | | 5/2008 |
| WO | WO2008-058685 | * | 5/2008 |

OTHER PUBLICATIONS

N. Gupta et al.; A direct current pulse technique to enhance conductivity of heterogeneous electrolytes; Journal of Power Sources; 2008; pp. 1415-1419; 185.

Binod Kumar et al.; Space Charge-Mediated Ionic Transport in Yttria-Stabilized Zirconia-Alumina Composite Membranes; Journal American Ceramic Society; 2008; pp. 1175-1181; vol. 91; No. 4; The American Ceramic Society.

Extended European Search Report (EESR) dated Oct. 30, 2009 pertaining to European Application No. 09163162.2.

Leo et al.; Effect of MgO addition on the ionic conductivity of LiGe2(PO4)3 ceramics; Solid State Ionics; Apr. 1, 2003; pp. 357-367; vol. 159; No. 3-4; North Holland Pub. Company; Amsterdam, NL.

Shin et al.; Effect of fillers on the electrochemical and interfacial properties of PEO-LiN(SO2CF2CF3)2 polymer electrolytes; Electrochimica Acta; Apr. 15, 2004; pp. 1605-1612; vol. 49; No. 9-10; Elsevier Science Publishers; Barking, GB.

Choi et al.; Effects of ceramic fillers on the electrical properties of (PEO)16LiClO4 electrolytes; Journal of Power Sources; Oct. 1, 1997; pp. 357-360; vol. 68; No. 2; Elsevier SA, CH.

Choi et al.; Effects of SiC and Si3N4 fillers on the electrical properties of (PEO)16LiClO4 electrolytes; Journal of Applied Electrochemistry; 1997; pp. 365-367; vol. 27.

Croce et al.; Nanocomposite polymer electrolytes for lithium batteries; Nature; Jul. 30, 1998; pp. 456-458; vol. 394; Nature Publishing Group; London; UK.

Stephan et al.; Review on composite polymer electrolytes for lithium batteries; Polymer; Jul. 26, 2006; pp. 5952-5964; vol. 47; No. 16; Elsevier Science Publishers B.V.; GB.

Election/Restrictions Requirement dated May 4, 2012, pertaining to U.S. Appl. No. 12/486,444.

Office Action pertaining to U.S. Appl. No. 12/486,444 dated Jun. 26, 2012.

Thokchom et al., "Water Durable Lithium Ion Conducting Composite Membranes from the Li2O-Al2O3-TiO2-P2O5 Glass-Ceramic", Journal of the Electrochemical Society 154 (4); pp. A331-A336, Feb. 20, 2007.

Final Office Action pertaining to U.S. Appl. No. 12/486,444 dated Jan. 31, 2013.

Office Action from JP Appln. No. 2009-146185 mailed Oct. 11, 2013.

Non-Final Office Action dated Nov. 5, 2014 pertaining to U.S. Appl. No. 12/486,444.

Final Rejection pertaining to U.S. Appl. No. 13/153,042 dated Nov. 5, 2014.

* cited by examiner

LITHIUM-AIR CELL INCORPORATING LITHIUM ALUMINUM GERMANIUM PHOSPHATE CATHODE

CROSS REFERENCE TO RELATED APPLICATIONS

This application is a continuation-in-part of U.S. application Ser. No. 12/486,444 filed Jun. 17, 2009 entitled LITHIUM-AIR CELLS INCORPORATING SOLID ELECTROLYTES HAVING ENHANCED IONIC TRANSPORT AND CATALYTIC ACTIVITY, which application claims the benefit of U.S. Provisional application No. 61/074,316 filed Jun. 20, 2008. This application also claims the benefit of U.S. Provisional Application No. 61/351,331, filed Jun. 4, 2010, entitled METHOD OF CATALYZING OXYGEN-REDUCTION REACTION USING LITHIUM ALUMINUM GERMANIUM PHOSPHATE GLASS-CERAMICS. The entire contents of said applications are hereby incorporated by reference.

STATEMENT REGARDING FEDERALLY SPONSORED RESEARCH OR DEVELOPMENT

This invention was made with government support under Contract No. FA8650-08-C-2917 awarded by the United States Air Force. The government has certain rights in the invention.

BACKGROUND OF THE INVENTION

Embodiments of the invention are directed to the use of lithium aluminum germanium phosphate (LAGP) glass-ceramic materials in cathode formulations to facilitate oxygen reduction reactions, and more particularly, to the use of LAGP in a cathode formulation for lithium-oxygen ($Li$—$O_2$) electrochemical cells.

The reduction of oxygen is a fundamental reaction and is the basis for the function of a number of industrial processes and products including fuel cells, batteries, oxygen separation membranes, and electrochemical sensors. The oxygen-reduction reaction is generally characterized as a sluggish reaction, often requiring the use of catalysts such as platinum (Pt) and/or the use of high temperatures to facilitate the reaction. However, the high cost of platinum group metals has increased the desire for the use of catalysts which are platinum free or which contain only low amounts of platinum group metals. Further, the use of high temperatures in the oxidation-reduction reaction often results in compromised product performance due to degradation of the materials.

Accordingly, there remains a need in the art for inexpensive materials which can be used to catalyze an oxygen reduction reaction at lower temperatures and which can be used in devices such as fuel cells, batteries, sensors, and the like.

SUMMARY OF THE INVENTION

Embodiments of the invention meet that need by the use of lithium aluminum germanium phosphate (LAGP) glass-ceramic materials in a cathode formulation to facilitate oxygen reduction reactions in lithium-air cells. The cathode formulation comprises a mixture of LAGP and carbon, which achieves a similar catalytic performance to that of the use of platinum or other platinum group metals but at a significantly reduced cost. In addition, the oxidation-reduction reaction can proceed at a temperature range of about −60° C. to about 150° C.

According to one embodiment, a lithium-air cell is provided comprising an anode comprising a lithium metal, a cathode comprising lithium aluminum germanium phosphate (LAGP) and carbon, and an electrolyte separating the anode and cathode. In one embodiment, the electrolyte is selected from a polymer-ceramic electrolyte, a glass-ceramic electrolyte, and combinations thereof.

In one embodiment the cathode comprises from about 5 to 30 wt % carbon and from about 70 to 95 wt % lithium aluminum germanium phosphate. The cathode may further comprise a binder selected from polytetrafluoroethylene, polyvinylidene fluoride, and polypropylene carbonate.

In one embodiment, the cathode comprises at least 50 wt % lithium aluminum germanium phosphate. In another embodiment, the cathode comprises at least 80 wt % lithium aluminum germanium phosphate.

The LAGP in the cathode has a porous structure which allows oxygen to be held in the structure for the oxygen reduction reaction. In one embodiment, the cathode has a porosity of from about 30 to 70%.

When incorporated in a lithium-air cell, the cathode facilitates oxygen reduction at a temperature of less than 100° C. In one embodiment, the cathode facilitates oxygen reduction at a temperature between about −20° C. to about 80° C. The lithium-air cell has a capacity of from about 10 μAh to 100 mAh.

In another embodiment of the invention, a lithium-air cell is provided which comprises an anode comprising a lithium metal, a cathode selected from lithium aluminum germanium phosphate (LAGP), lithium aluminum titanium phosphate (LATP), or combinations thereof; and an electrolyte separating the anode and cathode.

Accordingly, it is a feature of embodiments of the invention to provide a cathode comprising an LAGP material to catalyze the oxygen reduction reaction in a lithium-air cell. These, and other features and advantages of the invention will become apparent from the following detailed description, the accompanying drawings, and the appended claims.

DETAILED DESCRIPTION

Figure 1:
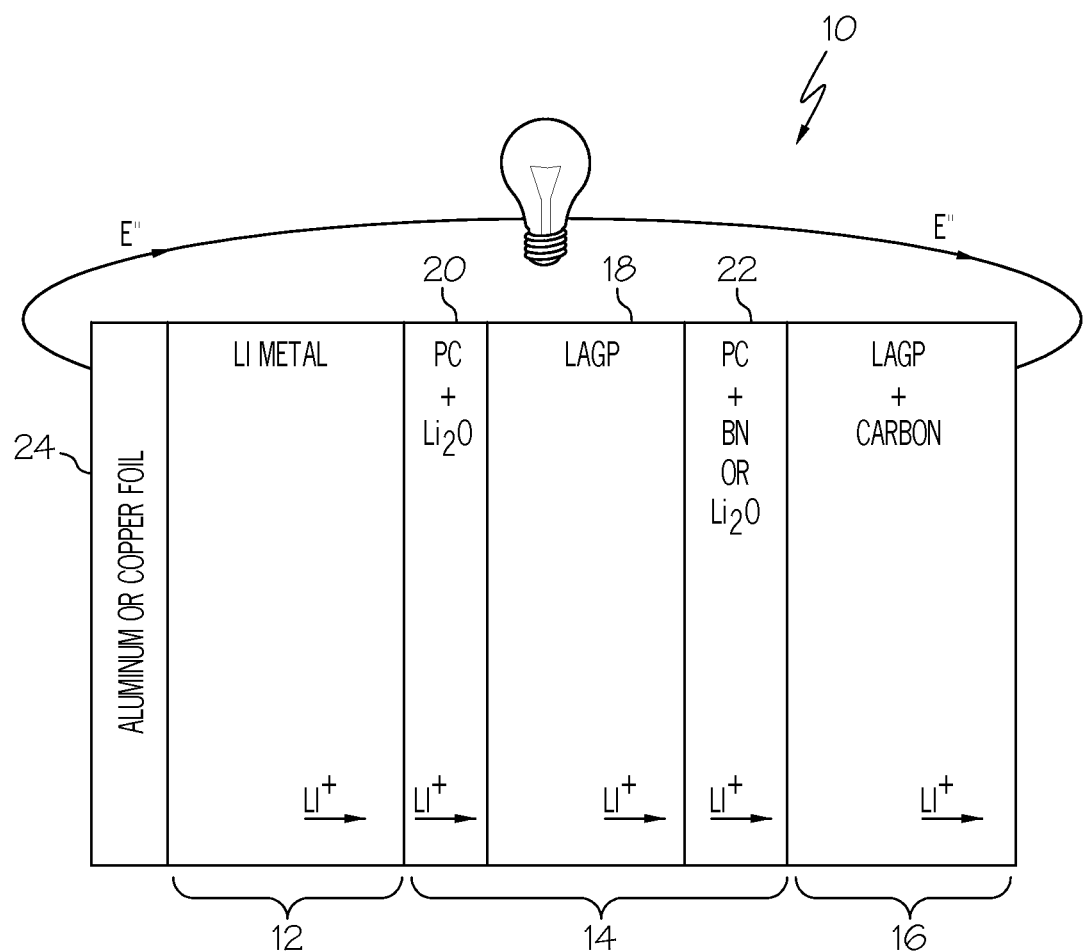
FIG. 1 is a schematic illustration of a lithium-oxygen cell including a cathode comprising LAGP and carbon.

The use of LAGP glass-ceramic materials in embodiments of the invention is applicable to a wide range of products including, but not limited to, lithium-air batteries, fuel cells, electrochemical sensors, and portable electronics such as cell phones, laptop computers, and cameras.

The LAGP glass-ceramic material used in embodiments of the invention has a Lisicon (lithium super ionic conductor) structure which consists of a highly conducting $Li_{1+x}Ge_{2-x}Al(PO_4)_3$ (LAGP) crystalline phase. The structure is shown and described in more detail in Kumar et al., Cathodes for Solid-State Lithium-Oxygen Cells: Roles of Nasicon Glass-Ceramics, *J. Electrochem. Soc.*, 175 (5) A611-A616 (2010), the disclosure of which is incorporated herein by reference.

The LAGP may be prepared by mixing and grinding 19.75 $Li_2O$, 6.17 $Al_2O_3$, 37.04 $GeO_2$, and 37.04 $P_2O_5$, followed by heating to a temperature of 1350° C. to form a glass which is then subsequently crystallized at about 750 to 850° C. to transform it into a glass-ceramic powder. The structure of the formed LAGP glass-ceramic powder has a number of cavities and tunnels therein defining a mesoporous structure. We have discovered that this structure allows atmospheric gases such as oxygen to be absorbed therein and facilitate the reduction of oxygen. See, Kumar et al., Lisicon Glass-Ceramics Mediated Catalysis of Oxygen Reduction, *Electrochemical and Solid-State Letters*, 14 (6) 1-3 (2011), the disclosure of which is incorporated herein by reference.

Thus, when incorporated in the cathode of $Li—O_2$ cells, the LAGP glass-ceramic powder facilitates the oxygen reduction reaction, i.e., oxygen molecules are adsorbed in the LAGP structure, followed by the reduction of the species into superoxide and peroxide molecules. The superoxide and peroxide species then interact with lithium ions to form respective discharge products (lithium oxide ($Li_2O$) and lithium peroxide ($Li_2O_2$)).

The LAGP facilitates oxygen molecule adsorption and subsequent reduction, while the carbon in the cathode formulation functions to allow transport of electrons in the vicinity of adsorbed molecules to facilitate transfer of electrons and reduction of oxygen molecules.

The LAGP also enhances electrode kinetics and rate capability, i.e., an increase in LAGP glass-ceramic powder in the cathode enhances the cell capacity and rate capability.

The cathode formulation comprises a mixture of LAGP, carbon powder, and a binder material. In one embodiment, a poly(tetrafluoroethylene) (PTFE) binder is used, although polyvinylidene fluoride and polypropylene carbonate are also suitable in other embodiments for use as binder materials. The carbon powder may comprise PWA activated carbon, Ketjen black, or combinations thereof.

It should be appreciated that while LAGP is preferred for use in the cathode formulation, it is also possible to use lithium aluminum titanium phosphate (LATP) in place of LAGP or in combination with LAGP for facilitating the oxygen reduction reaction in the cathode. The LATP may also be mixed with a binder and carbon as described above.

In one embodiment, the cathode is made by providing water-soluble PTFE in liquid form and adding it to a mixture of LAGP and carbon. The batch containing LAGP, carbon, and liquid PTFE may then be mixed and milled into a slurry. A small fraction of the slurry is then spread onto nickel mesh or foam used for structural support and is dried and sintered at about 300° C. in an argon atmosphere to obtain the cathode. The cathode may then be contained in a commercially available cell casing along with the other components of the cell, i.e., lithium anode and electrolyte.

In one embodiment, the electrolyte is in the form of a membrane comprised of LAGP, lithium-aluminum titanium phosphate (LATP), or derivatives thereof. Where the electrolyte comprises a LAGP glass-ceramic, it is noted that the LAGP material may be the same as that used in the cathode formulation. However, when used in the electrolyte, the LAGP is in the form of a dense, bulk thin film, while it is used in particle form (powder) in the cathode formulation.

In an alternative embodiment, the electrolyte membrane is in the form of a laminate comprising an LAGP or LATP glass-ceramic membrane positioned between two polymer-ceramic membranes. In one embodiment, the polymer-ceramic electrolyte membrane comprises PEO:LiBETI. The glass-ceramic membranes and/or polymer-ceramic membranes may further include a dielectric additive selected from $Li_2O$, BN, $SiO_2$, $Al_2O_3$, CaO, $ZrO_2$, $TiO_2$, $LiAlO_2$, and $Si_3N_4$. The dielectric additive may be added in an amount of from about 0.01 to about 10 wt %. The membrane laminate comprised of the LAGP and polymer ceramic materials provides high lithium-ion conductivity at ambient temperature and passivates the lithium anode surface to enhance lithium-electrolyte interfacial stability.

The electrolyte laminate membrane structure is electrochemically coupled to the lithium metal anode in the lithium-air cell.

Referring now to FIG. 1, one embodiment of a lithium-oxygen cell 10 is illustrated which includes a lithium anode 12, an electrolyte 14, and a cathode 16. In the embodiment shown, the solid electrolyte 14 is in the form of a laminate comprising a LAGP glass-ceramic membrane 18 and polymer-ceramic membranes 20, 22. As shown, the anode 12 and cathode 16 are separated by the electrolyte 14.

The lithium anode 12 comprises a lithium metal, but may also comprise a lithium alloy. As shown, the lithium anode is in contact with aluminum or copper foil 24 on one side which functions to protect the anode.

In use, the LAGP material in the cathode 16 allows oxygen to be adsorbed and the carbon in the cathode provides for reduction of oxygen by conduction of electrons to form superoxide, peroxide, and oxide molecules which then react with lithium ions to form discharge products. The anode is a source of lithium which is oxidized and transported through the membrane laminate under the influence of an electric field to the cathode. The lithium ions then react with the oxide molecules to form the discharge products. The LAGP material in the electrolyte functions to provide enhanced conductivity of lithium.

In order that the invention may be more readily understood, reference is made to the following examples which are intended to illustrate the invention, but not limit the scope thereof.

Example 1

LAGP cathode formulations were prepared in accordance with embodiments of the invention. The chemical compositions of the LAGP cathode formulations are shown in Table I below.

TABLE I

Cathode formulations (wt % and vol %), weight (g) of cathode electrodes used in the cell, cell capacities (mAh), and cathode capacities (mAh/g) of lithium-oxygen cell

| Cell | Cathode Composition ||||||  Weight of Cathode (C* + LAGP + PTFE) (g) | Cell Capacity (mAh) | Cathode Capacity (mAh/g) |
|---|---|---|---|---|---|---|---|---|---|
| | wt % ||| vol % ||||||
| | C* | LAGP | PTFE | C* | LAGP | PTFE | | | |
| 1 | 85.72 | 0 | 14.28 | 96.39 | 0 | 3.61 | 0.0259 | 0.70 | 27 |
| 2 | 42.77 | 42.76 | 14.47 | 87.35 | 5.81 | 6.84 | 0.1119 | 4.87 | 44 |
| 3 | 21.40 | 64.17 | 14.43 | 73.86 | 14.70 | 11.44 | 0.0859 | 13.20 | 154 |
| 4 | 8.56 | 77.06 | 14.38 | 50.40 | 30.13 | 19.47 | 0.0459 | 14.34 | 312 |
| 5 | 4.27 | 81.10 | 14.63 | 33.33 | 41.18 | 25.49 | 0.0082 | — | — |

C* = PWA activated carbon (60 wt %) + Ketjen black (40 wt %)

The formulations primarily consisted of a mixture of LAGP, carbon powder, and poly(tetrafluoroethylene) (PTFE) binder. Water-soluble PTFE in liquid form was added as a binder to the mixture of LAGP and carbon. The compositions in Table 1 show the weight and volume percent of carbon, LAGP, and solid PTFE as they were formulated. The batch containing LAGP, carbon, and liquid PTFE was mixed and milled into a slurry. A small fraction of the slurry was spread onto nickel mesh or foam, and was subsequently dried and sintered at 300° C. in an argon atmosphere to obtain a working cathode. The working cathode contained about 0.01 to 0.10 g of the active materials (carbon, LAGP, and binder) on the nickel mesh. Table 1 also shows the weight of the active materials in the cathode. The carbon in the cathode formulation was a mixture of PWA activated carbon (60 wt %) and Ketjen black (40 wt %).

The working cathodes were coupled with an anodic lithium metal and a membrane laminate consisting of a LAGP glass-ceramic material and polymer-ceramic materials comprising a poly(ethylene oxide) (PEO):Lithium bis(perfluoroethylsulfonyl)imide (LiBETI) (8.5:1) with 1 wt % $Li_2O$ composition and a PEO:LiBETI (8.5:1) with 1 wt % boron nitride (BN) composition.

The components (i.e., lithium anode, membrane laminate, cathode, and current collectors) were then contained in commercially available cell casings with an O-ring and spacer. The cathode side of the cell casing was drilled with 46 holes, and all the cells contained holes of similar diameter and symmetry. The components along the casing, O-ring, and spacer were pressed to seal using a Hohsen cell maker (Hohsen Corporation, Osaka, Japan) into a working lithium-oxygen ($Li-O_2$) cell. The cells were discharged and charged under a carefully controlled oxygen atmosphere. In all the cases, the cell area was 2.00 $cm^2$.

The assembled cells were electrochemically characterized using a Solartron instrument (Model 1260 with an electrochemical interface; Solartron, Houston, Tex.).

The open-circuit voltage (OCV) of the cell was measured as a function of three parameters: state of charge/discharge, oxygen pressure on cathode, and temperature. The electrochemical reaction of the cell was also characterized gravimetrically. The $Li-O_2$ cell was discharged at 75° C. with a current of 0.2 mA down to 1.0 V. The measured discharge capacity and weight gain of the cell were 14.34 mAh and 16.00 mg, respectively. The experimental weight gain was higher than the theoretical weight gain; 12.573 mg where lithium peroxide ($Li_2O_2$) is assumed to be the discharge reaction product. The difference between the experimental and theoretical values may be attributed to the formation of lithium superoxide ($LiO_2$) along with $Li_2O_2$ and $Li_2O$.

It is believed that the cell reactions proceeded according to Reactions 1-3:

$$Li + O_2 \leftrightarrows LiO_2 \quad [1]$$

$$2Li + O_2 \leftrightarrows Li_2O_2 \quad [2]$$

$$2Li + \tfrac{1}{2}O_2 \leftrightarrows Li_2O \quad [3]$$

Figure 2:
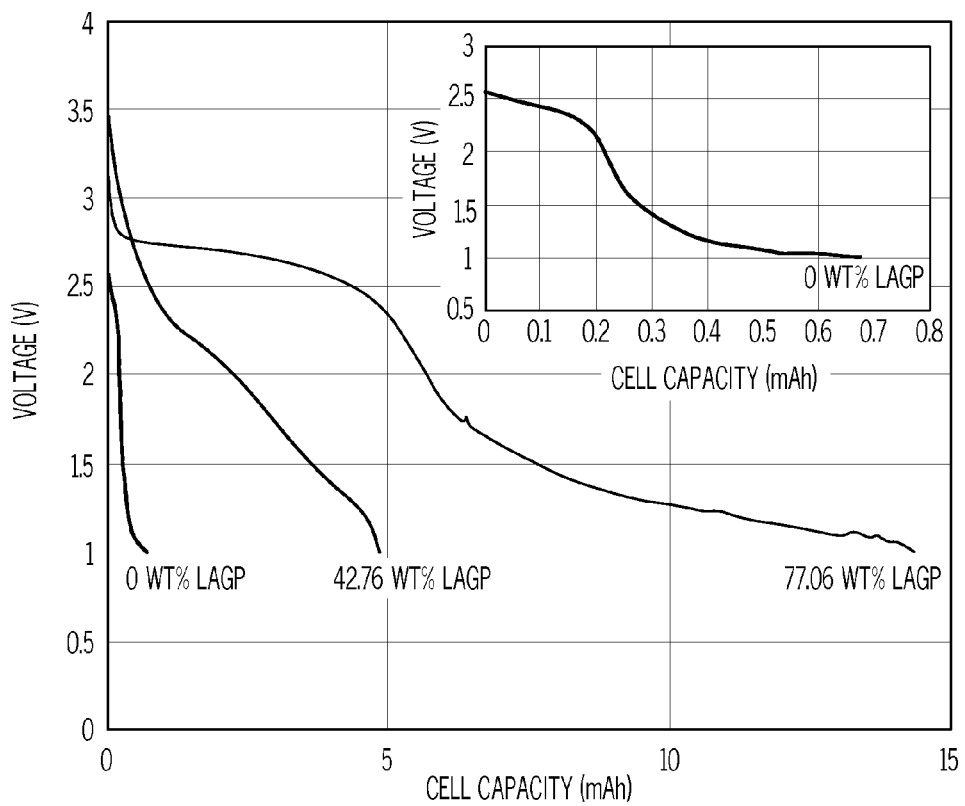
FIG. 2 is a graph illustrating the capacities of cathode formulations including various concentrations of LAGP.

FIG. 2 shows the capacities of the $Li-O_2$ cells with cathode formulation nos. 1, 2 and 4 corresponding to 0, 42.77 and 77.06 wt % LAGP, respectively, with a discharge current of 0.2 mA at 75° C. As can be seen, the capacity of the cell increased with increasing concentration of LAGP. The highest discharge capacity was associated with a cathode formulation that contained 77.06 wt % LAGP. The capacity was reduced to about one-third when the LAGP concentration was 42.77 wt %. The processing parameters (milling, casting, drying, and sintering) of the three cathodes were kept constant to achieve similar cathode morphology and porosity. The discharge curve of the cathode containing 77.06 wt % LAGP also showed a discharge at a higher voltage (2.75 V) up to about 6 mAh of its capacity. A subsequent discharge was followed by a step and a lower voltage.

Figure 3:
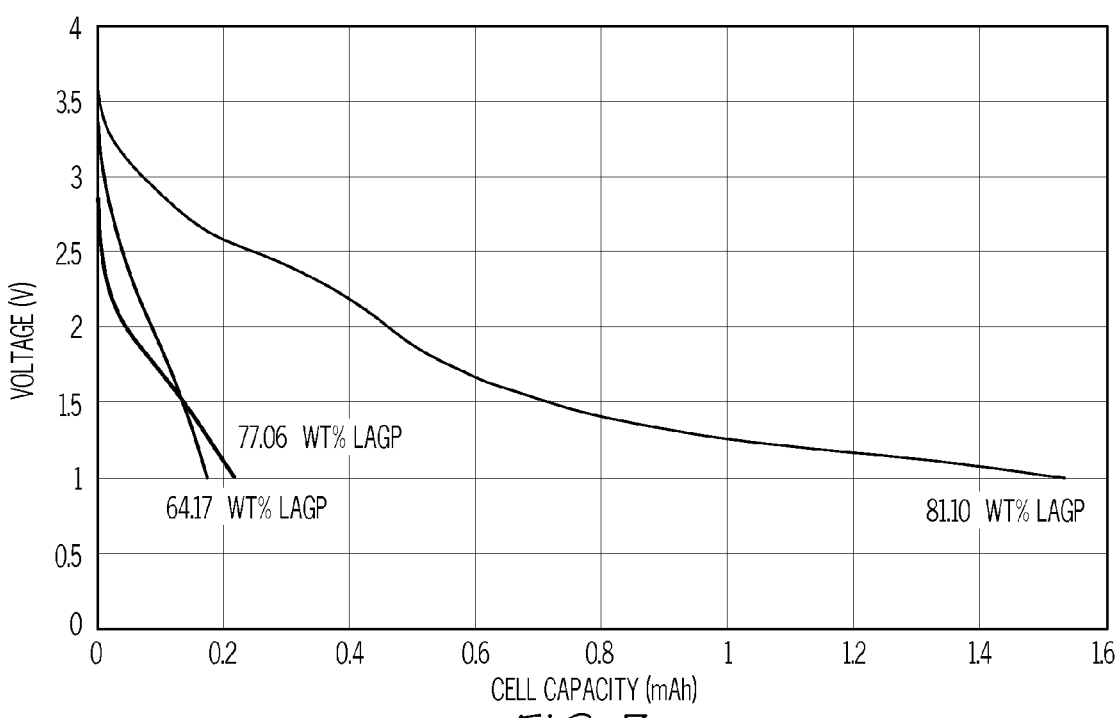
FIG. 3 is a graph illustrating the effect of LAGP concentration on the discharge capacity of a $Li$—$O_2$ cell.

The capacities of the cathode formulations corresponding to 64.17, 77.06, and 81.10 wt % LAGP (Nos. 3, 4, and 5 cathode formulations) at 75° C. with a discharge current of 1 mA are shown in FIG. 3. The discharge curves show that the concentration of LAGP has a major influence on the capacity. The highest capacity was obtained from a cathode formulation that contained 81.10 wt % LAGP. A similar trend is shown in FIG. 2, although at a lower discharge current (0.2 mA). Thus, the higher the discharge current, the lower the capacity.

Figure 4A:
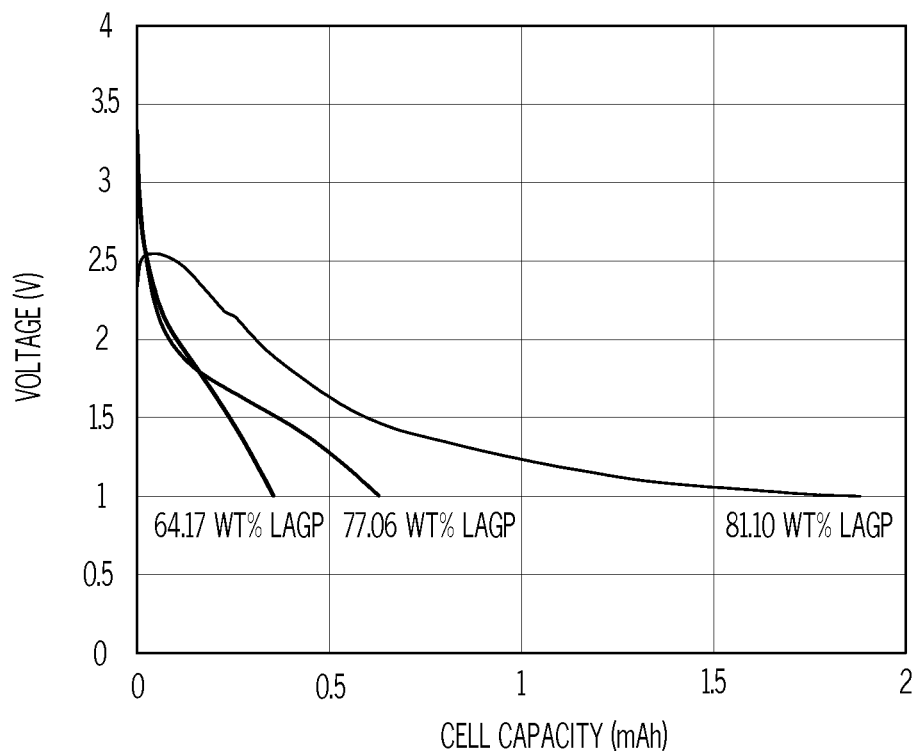
FIGS. 4A and 4B illustrate the effect of LAGP concentrations on the discharge capacity of a $Li$—$O_2$ cell.
Figure 4B:
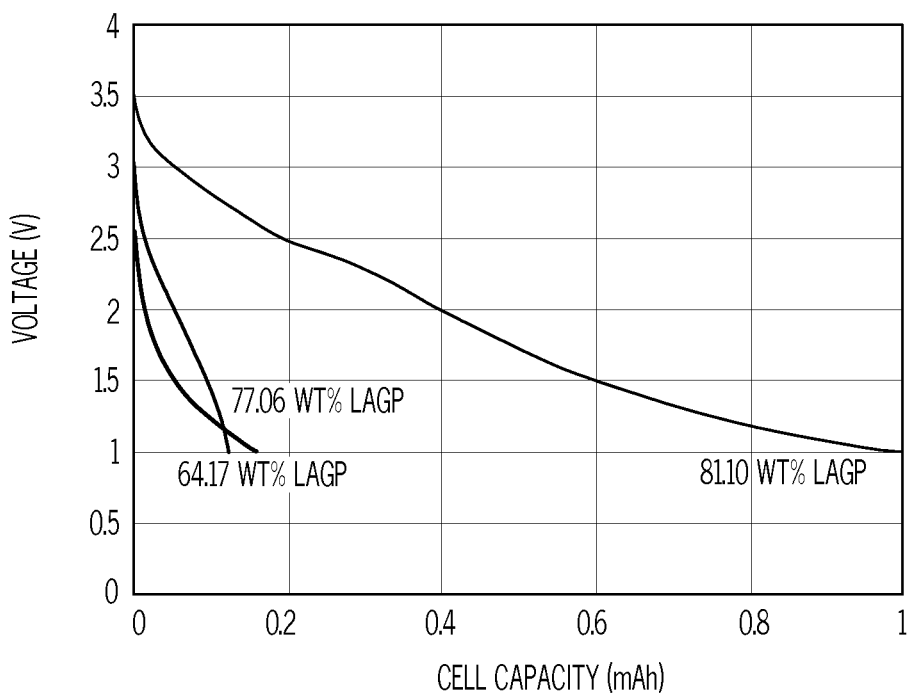

The capacities of the No. 3, 4 and 5 cathode formulations at 85° C. and 1 mA discharge current are shown in FIG. 4A. The capacities of the cells slightly increased with the increase in temperature from 75° C. (FIG. 4) to 85° C. The capacity declined after the discharge current was increased from 1 mA (FIG. 6A) to 2 mA at 85° C. as shown in FIG. 4B. The capacity decline was most severe for 64.17 wt % LAGP, which decreased from 0.35 to 0.15 mAh.

The capacities of cathode formulations 1 to 4 were measured at 75° C. with a discharge current of 0.2 mA. The cell and cathode capacities are shown in Table I. A cathode with only carbon (no. 1) yielded a very small capacity because the electrochemical reaction sites were limited to the membrane-cathode interfacial region. The cathode capacity showed major enhancements as the LAGP concentration was increased.

Figure 5:
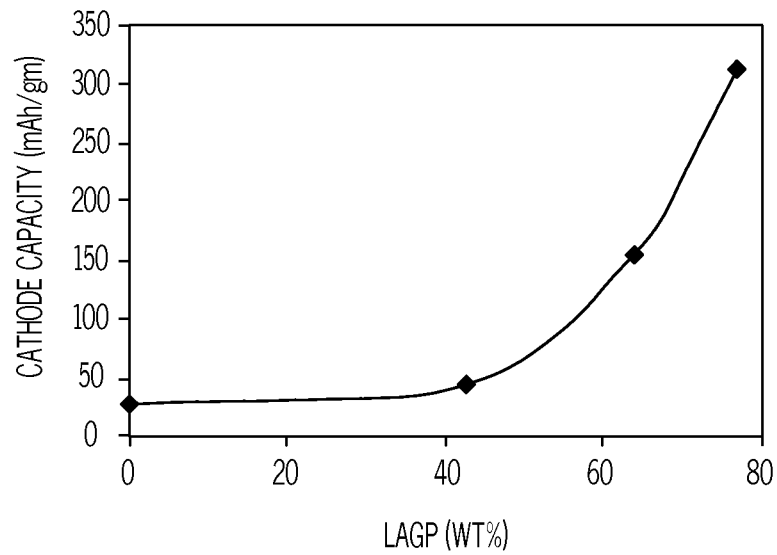
FIG. 5 illustrates cathode capacity as a function in LAGP concentration.

A plot of cathode capacity (mAh/g) vs. LAGP concentration (in wt %) is shown in FIG. 5. The capacity increased exponentially as the LAGP concentration approached 100 wt %. The carbon in the cathode formulations functioned as an electronic conductor to transport electrons and facilitate the electrochemical reaction. The concentration of carbon in cathode formulations 4 and 5 was 8.56 and 4.27 wt %, respectively. However, volumetrically the carbon concentrations were relatively high (50.40 and 33.33%). The volumetric concentrations of carbon in cathode formulations 4 and 5 were more than adequate to allow percolation and transport of electrons to the electrochemical reaction sites.

Figure 6:
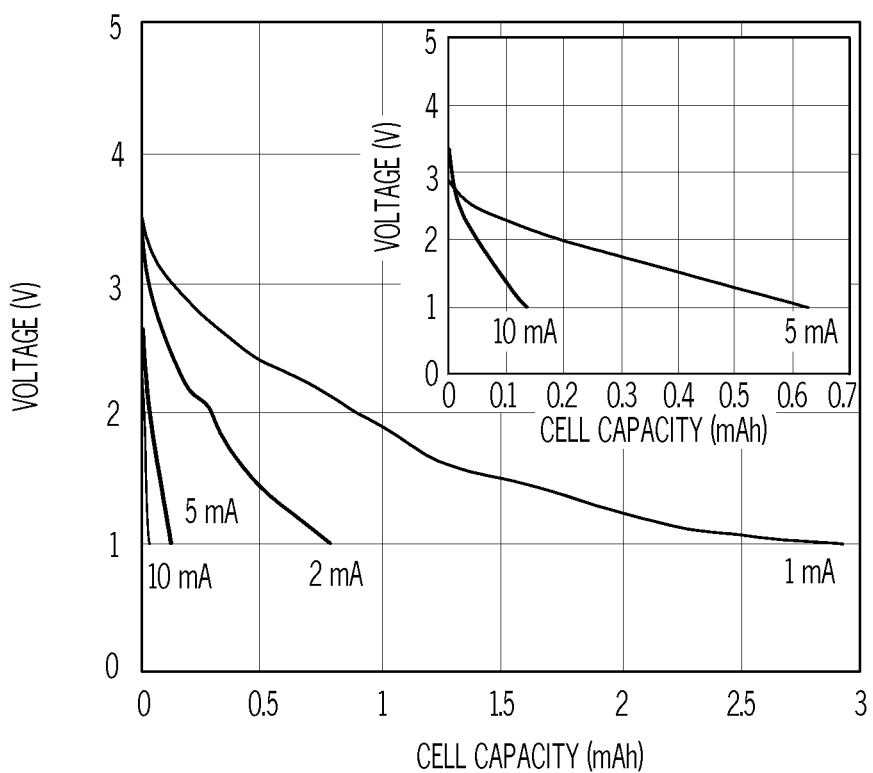
FIG. 6 illustrates discharge capacity as a function of discharge current for a $Li$—$O_2$ cell having a cathode comprising LAGP and carbon.

The effect of discharge current on voltage and capacity for the cathode formulation No. 5 containing 81.10 wt % LAGP is shown in FIG. 6. The capacity declined from 2.57 to about 0.05 mAh when the discharge current was increased from 1 to 10 mA. This cathode formulation allowed discharge of the cell at 10 mA. None of the other cathode formulations could be discharged above 5 mA for a significant period (a few seconds).

The data shown in FIGS. 2 to 6 indicates a relationship between the electrical performance (rate capability and capacity) and LAGP concentration in the cathodes of the Li—$O_2$ cells. In general, as the LAGP concentration was increased, both the capacity and the rate capability increased. The capacity (coulomb) is the base quantity and the rate capability (coulomb per second) is the derivative of the capacity. The LAGP functions to enhance both of these electrochemical parameters in the cathode. It is believed that the enhanced capacity occurs based on the formation of a larger concentration of discharge products in the cathode: the higher the concentration of the discharge products, the greater the capacity. While not wishing to be bound by theory, the rate capability of the cell is believed to result from an enhancement of cathodic reactions facilitated by the LAG P.

Further, increasing LAGP concentration increases the rate of capability and capacity, which is also believed to occur due to the reduction of oxygen by the LAGP cathode.

The interaction of oxygen molecules with LAGP and the formation of $Li_2O_2$ are illustrated by Reactions 4-6:

$$2LAGP\text{-}Li^+ + O_2 \rightarrow 2LAGP\text{-}Li^+{:}O \quad [4]$$

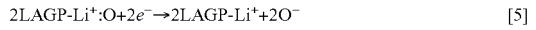

$$2LAGP\text{-}Li^+{:}O + 2e^- \rightarrow 2LAGP\text{-}Li^+ + 2O^- \quad [5]$$

$$2Li^+ + 2O^- \rightarrow Li_2O_2 \quad [6]$$

Similar reactions involving $LiO_2$ and $Li_2O$ as the reaction product are also possible. The adsorption and bonding of $O_2$ molecules onto the LAGP surface is illustrated by Reaction 4. An intermediate bond strength of the LAGP-$Li^+$:0 is desirable. If this bond is too weak, then it is difficult for oxygen to remain in contact with the LAGP for the subsequent Reaction 5 to occur. The adorbed oxygen is reduced by electrons (provided by carbon) to form peroxide ions. In this case, if the bond is too strong, it would be difficult to liberate peroxide ions ($2O^-$) to carry out Reaction 6. Therefore, optimum results are achieved with an intermediate strength bonding of oxygen in the LAGP-$Li^+$:0 complex. The final reaction, Reaction 6, involves lithium and peroxide ions to form $Li_2O_2$.

Reactions 4-6 illustrate that the diffusion of oxygen and consumption of electrons (reduction) at the cathode must be facilitated to enhance the discharge current.

Having described the invention in detail and by reference to preferred embodiments thereof, it will be apparent that modifications and variations are possible without departing from the scope of the invention.

What is claimed is:

1. A lithium-air cell comprising:
   an anode comprising a lithium metal, wherein oxidation of the lithium metal to lithium ions occurs during discharge cycles of the lithium-air cell;
   a porous cathode at which reduction of oxygen and formation of lithium oxide or lithium peroxide occur during the discharge cycles of the lithium-air cell, the porous cathode comprising lithium aluminum germanium phosphate (LAGP) glass-ceramic powder and carbon, wherein said lithium aluminum germanium phosphate facilitates the reduction of oxygen by adsorption of oxygen onto said porous cathode; and
   an electrolyte laminate membrane structure separating said anode and said porous cathode, said electrolyte laminate membrane structure comprising a glass-ceramic membrane positioned between a first polymer-ceramic membrane and a second polymer-ceramic membrane,
   wherein:
   said first polymer-ceramic membrane is between said anode and said glass-ceramic membrane;
   said first polymer-ceramic membrane is a poly(ethylene oxide):lithium bis(perfluoroethylsulfonyl)imide (PEO: LiBETI) membrane containing from 0.01 wt % to 10 wt % $Li_2O$ dielectric additive;
   said glass-ceramic membrane is a lithium aluminum germanium phosphate (LAGP) membrane;
   said lithium aluminum germanium phosphate (LAGP) membrane comprises from 0.01 wt % to 10 wt % $Li_2O$ added to a lithium aluminum germanium phosphate (LAGP) crystalline phase;
   said second polymer-ceramic membrane is between said porous cathode and said glass-ceramic membrane; and
   said second polymer-ceramic membrane is a poly(ethylene oxide):lithium bis(perfluoroethylsulfonyl)imide (PEO: LiBETI) membrane containing from 0.01 wt % to 10 wt % boron nitride dielectric additive.

2. The lithium-air cell of claim 1, wherein said cathode comprises from 5 wt % to 30 wt % carbon and from 70 wt % to 95 wt % lithium aluminum germanium phosphate.

3. The lithium-air cell of claim 1, wherein said porous cathode further comprises a binder selected from polytetrafluoroethylene, polyvinylidene fluoride, and polypropylene carbonate.

4. The lithium-air cell of claim 1, wherein said porous cathode has a porosity of from about 30% to 70%.

5. A lithium-air cell comprising:
   an anode comprising a lithium metal, wherein oxidation of the lithium metal to lithium ions occurs during discharge cycles of the lithium-air cell;
   a porous cathode at which reduction of oxygen and formation of lithium oxide or lithium peroxide occur during the discharge cycles of the lithium-air cell, the porous cathode comprising a carbon material and a glass-ceramic material selected from lithium aluminum germanium phosphate (LAGP) lithium aluminum titanium phosphate (LATP), or combinations thereof, wherein said porous cathode facilitates the reduction of oxygen by the adsorption of oxygen therein, said porous cathode having a porosity of from 30% to 70%; and
   an electrolyte laminate membrane structure separating said anode and said porous cathode, said electrolyte laminate membrane structure comprising a glass-ceramic membrane positioned between a first polymer-ceramic membrane and a second polymer-ceramic membrane, wherein:
said first polymer-ceramic membrane is between said anode and said glass-ceramic membrane;
said second polymer-ceramic membrane is between said porous cathode and said glass-ceramic membrane;
said first polymer-ceramic membrane comprises poly(ethylene oxide):lithium bis(perfluoroethylsulfonyl)imide (PEO:LiBETI) and said first dielectric additive;
said first polymer-ceramic membrane comprises a first dielectric additive;
said first dielectric additive is $Li_2O$;
said first polymer-ceramic membrane comprises from 0.01 wt % to 10 wt % said first dielectric additive;
said second polymer-ceramic membrane comprises polyethylene oxide):lithium bis(perfluoroethylsulfonyl)imide (PEO:LiBETI) and said second dielectric additive;
said second polymer-ceramic membrane comprises a second dielectric additive;
said second dielectric additive is boron nitride or $Li_2O$;
said second polymer-ceramic membrane comprises from 0.01 wt % to 10 wt % said second dielectric additive.

6. The lithium-air cell of claim 5, wherein said glass-ceramic membrane comprises a glass-ceramic material and a third dielectric additive.

7. The lithium-air cell of claim 5, wherein:
said porous cathode comprises from 70 wt % to 95 wt % lithium aluminum germanium phosphate (LAGP) in powder form and from 5 wt % to about 30 wt % carbon material; and
said glass-ceramic membrane is a bulk thin film of lithium aluminum germanium phosphate (LAGP).

8. The lithium-air cell of claim 5, wherein:
said glass-ceramic membrane comprises a glass-ceramic material and a third dielectric additive; and
said glass-ceramic material is lithium aluminum germanium phosphate (LAGP) or lithium aluminum titanium phosphate (LATP).

9. The lithium-air cell of claim 8, wherein:
said third dielectric additive is $Li_2O$.

10. The lithium-air cell of claim 8, wherein:
said glass-ceramic membrane is a lithium aluminum germanium phosphate (LAGP) membrane comprising from 0.01 wt % to 10 wt % said third dielectric additive.

11. The lithium-air cell of claim 10, wherein:
said third dielectric additive is $Li_2O$.

12. The lithium-air cell of claim 5, wherein:
said porous cathode comprises from 70 wt % to 95 wt % lithium aluminum germanium phosphate (LAGP) in powder form and from 5 wt % to about 30 wt % carbon material; and
said glass-ceramic membrane comprises a glass-ceramic material and a third dielectric additive;

said glass-ceramic material is a lithium aluminum germanium phosphate (LAGP) crystalline phase;
said third dielectric additive is $Li_2O$.

13. The lithium-air cell of claim 12, wherein said second dielectric additive is boron nitride.

14. A lithium-air cell comprising:
an anode comprising a lithium metal, wherein oxidation of the lithium metal to lithium ions occurs during discharge cycles of the lithium-air cell;
a porous cathode at which reduction of oxygen and formation of lithium oxide or lithium peroxide occur during the discharge cycles of the lithium-air cell; and
an electrolyte laminate membrane structure separating said anode and said porous cathode, said electrolyte laminate membrane structure comprising a glass-ceramic membrane positioned between a first polymer-ceramic membrane and a second polymer-ceramic membrane,
wherein:
said porous cathode comprises active materials in a binder selected from polytetrafluoroethylene, polyvinylidene fluoride, and polypropylene carbonate;
said active materials comprise from 70 wt % to 95 wt % lithium aluminum germanium phosphate (LAGP) in powder form and from 5 wt % to about 30 wt % carbon;
said porous cathode has a porosity of from 30% to 70%;
said first polymer-ceramic membrane is between said anode and said glass-ceramic membrane;
said first polymer-ceramic membrane is a poly(ethylene oxide):lithium bis(perfluoroethylsulfonyl)imide (PEO:LiBETI) membrane containing from 0.01 wt % to 10 wt % $Li_2O$ dielectric additive that passivates a lithium anode surface of the anode during the discharge cycles of the lithium-air cell;
said glass-ceramic membrane is a lithium aluminum germanium phosphate (LAGP) membrane in bulk thin film form;
said lithium aluminum germanium phosphate (LAGP) membrane comprises from 0.01 wt % to 10 wt % $Li_2O$ added to a lithium aluminum germanium phosphate (LAGP) crystalline phase;
said second polymer-ceramic membrane is between said porous cathode and said glass-ceramic membrane; and
said second polymer-ceramic membrane is a poly(ethylene oxide):lithium bis(perfluoroethylsulfonyl)imide (PEO:LiBETI) membrane containing from 0.01 wt % to 10 wt % boron nitride dielectric additive.

15. The lithium-air cell of claim 14, wherein the first polymer-ceramic membrane contains 1 wt % $Li_2O$ dielectric additive and the second polymer-ceramic membrane contains 1 wt % boron nitride dielectric additive.

* * * * *